United States Patent
Harrison et al.

(10) Patent No.: US 9,403,136 B2
(45) Date of Patent: Aug. 2, 2016

(54) DUAL VESSEL REACTOR

(75) Inventors: Brian Harrison, Kanata (CA); Hurdon Hooper, Fredericton (CA)

(73) Assignee: RUBRECO INC., Fredericton (CA)

( * ) Notice: Subject to any disclaimer, the term of this patent is extended or adjusted under 35 U.S.C. 154(b) by 387 days.

(21) Appl. No.: 12/567,133

(22) Filed: Sep. 25, 2009

(65) Prior Publication Data

US 2010/0113705 A1 May 6, 2010

Related U.S. Application Data

(60) Provisional application No. 61/100,014, filed on Sep. 25, 2008.

(51) Int. Cl.
*B01J 3/04* (2006.01)

(52) U.S. Cl.
CPC .. *B01J 3/04* (2013.01); *B01J 3/046* (2013.01); *B01J 2219/0015* (2013.01); *B01J 2219/00083* (2013.01); *B01J 2219/00135* (2013.01); *B01J 2219/00162* (2013.01)

(58) Field of Classification Search
CPC ....... B01J 3/04; B01J 3/046; B01J 2219/0015
USPC ......... 422/208, 240, 241, 242, 410, 414, 110, 422/114
See application file for complete search history.

(56) References Cited

U.S. PATENT DOCUMENTS

| | | | |
|---|---|---|---|
| 3,056,664 A * | 10/1962 | Dravnieks et al. | 422/199 |
| 3,646,320 A * | 2/1972 | Rosatelli et al. | 219/401 |
| 3,659,584 A | 5/1972 | Doyle et al. | |
| 4,167,968 A | 9/1979 | Wietelmann | |
| 4,827,180 A | 5/1989 | Sone et al. | |
| 4,892,707 A | 1/1990 | Stockton et al. | |
| 4,963,499 A | 10/1990 | Stockton et al. | |
| 5,557,162 A | 9/1996 | Han | |
| 5,582,799 A * | 12/1996 | Amorese et al. | 422/118 |
| 5,762,341 A | 6/1998 | Wright | |
| 5,932,182 A | 8/1999 | Blaney | |
| 6,939,521 B1 * | 9/2005 | Chiu et al. | 422/203 |
| 2008/0044342 A1* | 2/2008 | Muller et al. | 423/522 |
| 2011/0212003 A1 | 9/2011 | Harrison et al. | |

FOREIGN PATENT DOCUMENTS

| | | |
|---|---|---|
| CA | 2582815 A1 | 9/2007 |
| JP | 2003340261 A | 12/2003 |
| WO | 2007109889 A1 | 10/2007 |

* cited by examiner

*Primary Examiner* — Lessanework Seifu
(74) *Attorney, Agent, or Firm* — Pearne & Gordon LLP

(57) ABSTRACT

A dual vessel reactor and a method of carrying out a reaction using a dual vessel reactor are provided using a non-condensable gas to substantially isolate the inner vessel from the outer vessel during the reaction and limit the heating of the outer vessel when steam from the inner vessel condenses on the interior surface of the outer vessel. By limiting the heating of the outer vessel through the condensation of the steam or other vapor from the inner vessel, the operating temperature of the outer vessel is kept below an upper threshold of the operating temperature of a seal used to seal the door in the outer vessel.

13 Claims, 6 Drawing Sheets

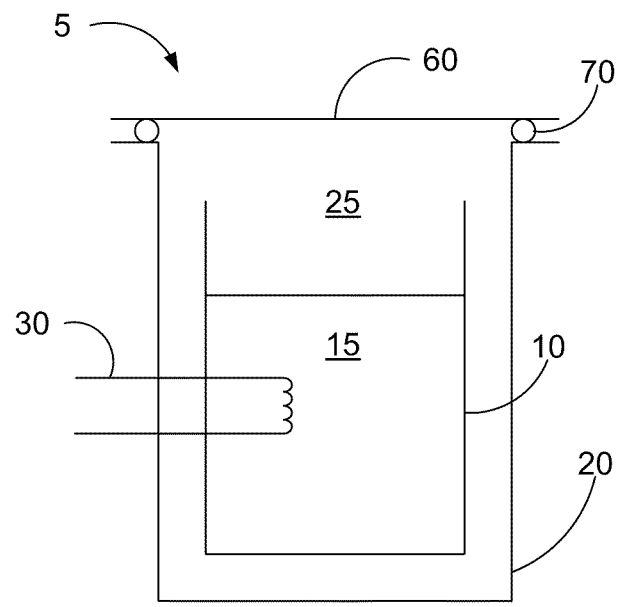
Figure 1 – PRIOR ART
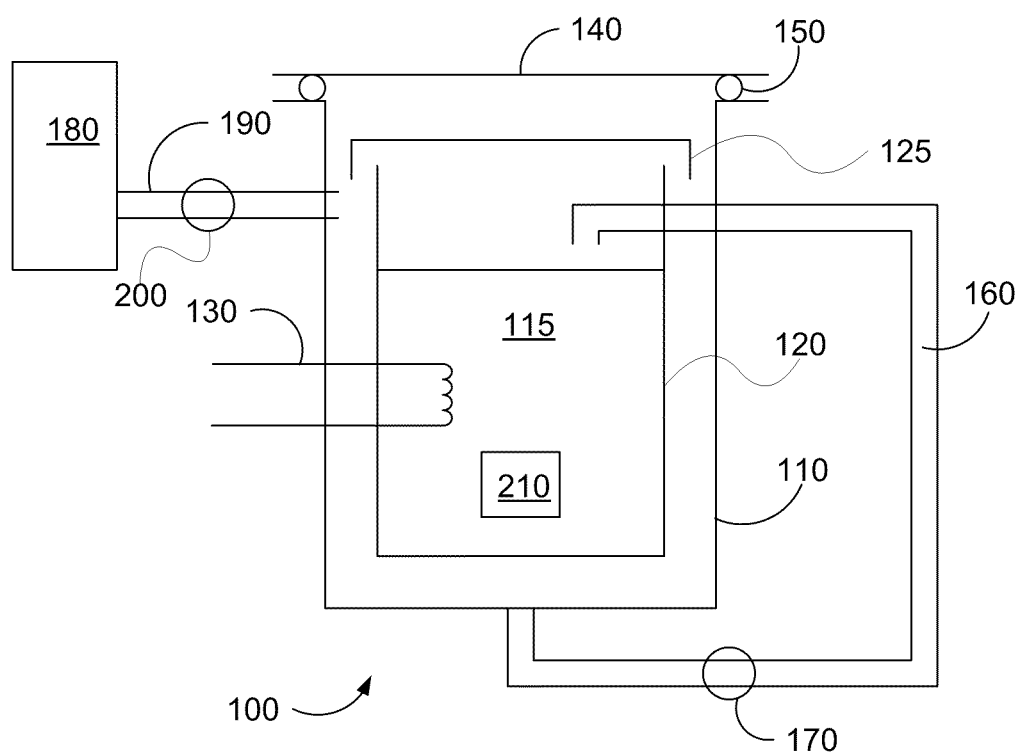
Figure 2

DUAL VESSEL REACTOR

FIELD OF THE INVENTION

The invention relates to a reactor for high pressure and high temperature reactions and more specifically to a dual vessel reactor.

BACKGROUND

Many reactions require high temperatures and pressures to take place and are therefore carried out in a reactor. As a result, reactors typically have an outer pressure vessel for withstanding the pressure in the reactor. A dual vessel reactor has an inner vessel in which the reaction may be carried out. The inner vessel is heated to a reaction temperature either by an external source or by the reaction itself. The outer vessel is typically a pressure vessel and has a relatively large thickness as compared to the inner vessel wall so that the reactor can handle elevated reaction pressures.

Some chemical reactions, for example, the devulcanization of rubber, require temperatures as high as 350° C. As a result, a door in the outer vessel requires that a metal ring be used to seal the door with the reactor when in the closed position. A rubber seal cannot be used as the high temperatures of the reactor and specifically the outer vessel damage the seal and can cause failure of the seal which is costly and creates safety issues when the pressure can no longer be contained.

Metal seals, such as metal American Petroleum Institute (API) rings, are costly, can only be used once, and therefore drive up the cost of running a reaction in a reactor. Furthermore, reactors having outer vessels that experience higher operating temperatures, experience higher rates of corrosion on the metals used in the outer vessel and therefore require the use of costly metals such as stainless steel or other equivalent costly alloys in fabrication. Any increase in temperature of the outer vessel increases the corrosion rate. Furthermore, conventional coatings, such as paints, that can be used to protect steel at elevated temperatures are difficult to find.

Water cooling the seal is a possibility, and water cooled seals are available. However water cooling the large metal flange which houses the seal will result in the flange operating at lower temperatures and as a consequence will cause a substantial amount of condensation onto it, and heat transfer to it. Ignoring for a minute the costs associated with this heat loss, such a loss of heat will ultimately limit the operating temperature of the reactor, that is, the heat that is being added to heat the vessel is being lost through condensation on the flange. As a result, water cooling the seal is undesirable.

A need therefore exists for a dual vessel reactor for use in reactions having a high reaction temperature, having an outer vessel suitable for operation with a non-metal seal and a method of carrying out a reaction in a reactor wherein the outer vessel of the reactor does not exceed an operating temperature of a non-metal seal or has an operating temperature lower than the reaction temperature.

SUMMARY

In one illustrative embodiment there is provided a dual vessel chemical reactor comprising:
   an outer vessel;
   a reactor lid on the outer vessel, the reactor lid openable for accessing the inner vessel;
   an inner vessel within the outer vessel for containing a liquid, the inner vessel in atmospheric communication with the outer vessel;
   a heat source for heating a liquid in the inner vessel;
   a seal for sealing the reactor lid with the outer vessel when in a closed position;
   an inner vessel lid for covering the inner vessel;
   wherein during operation a non-condensable gas is used to substantially insolate the outer vessel from the inner vessel.

In another illustrative embodiment, the reactor as described above further comprises:
   a non-condensable gas input for inputting the non-condensable gas into the outer vessel.

In another illustrative embodiment there is provided a method of maintaining an outer vessel at a temperature below a reaction temperature while carrying out a reaction in a dual vessel chemical reactor, the dual vessel chemical reactor having an inner vessel in atmospheric communication with the outer vessel and substantially partitionable from the outer vessel. The method comprises the steps of: adding a non-condensable gas to the reactor; heating a liquid in the inner vessel to generate a vapour; and substantially partitioning the non-condensable gas in the outer vessel and the vapour in the inner vessel.

In another illustrative embodiment there is provided a method of carrying out a chemical reaction in a dual vessel chemical reactor, the dual vessel chemical reactor having an inner vessel in atmospheric communication with the outer vessel and substantially partitionable from the outer vessel. The method comprises the steps of adding a non-condensable gas to the reactor; adding a reactant to a liquid in the inner vessel; heating the liquid in the inner vessel to generate a vapour; and substantially partitioning the non-condensable gas in the outer vessel and the vapour in the inner vessel.

BRIEF DESCRIPTION OF THE DRAWINGS

FIG. 1 is a schematic of a prior art reactor wherein the outer vessel has an operating temperature exceeding that of the operating temperature of a rubber seal;

FIG. 2 is an illustrative schematic of one embodiment of a dual vessel chemical reactor.

DETAILED DESCRIPTION

Figure 3:
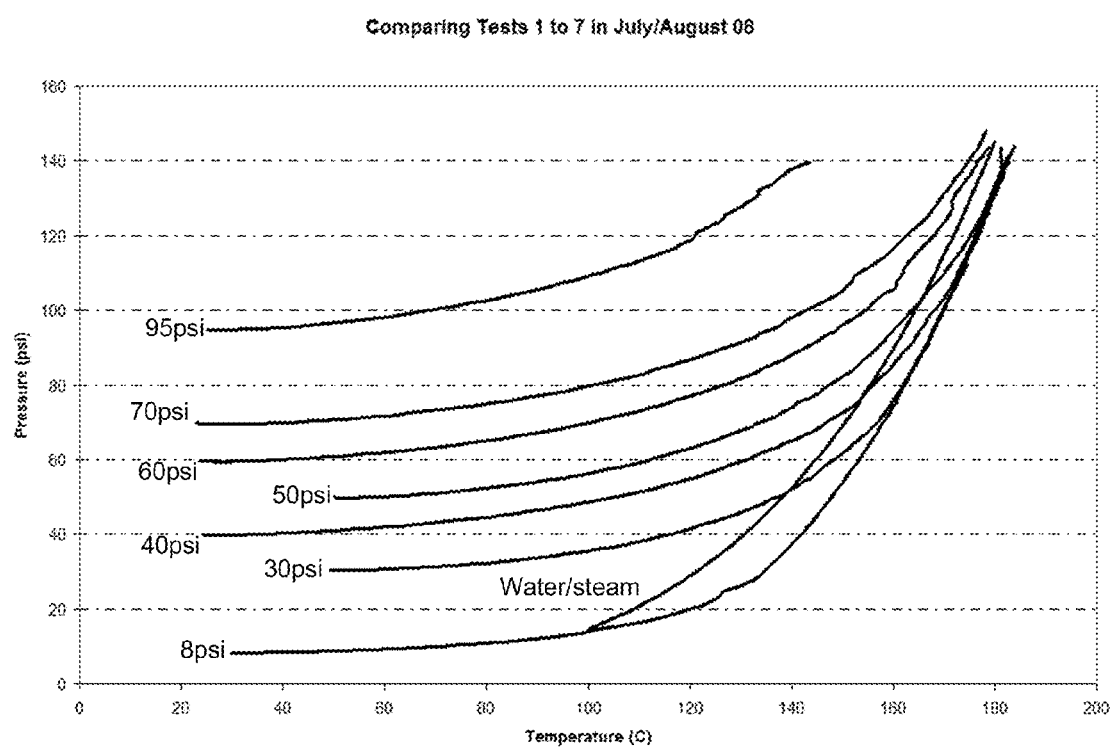
FIG. 3 is a graph illustrating test results for operating an embodiment of the reactor at various starting pressures of non-condensable gas over a range of temperatures.

A dual vessel reactor and a method of carrying out a reaction using a dual vessel reactor are provided using a non-condensable gas to substantially isolate the inner vessel from the outer vessel during the reaction and limit the heating of the outer vessel when steam from the inner vessel condenses on the interior surface of the outer vessel. By limiting the heating of the outer vessel through the condensation of the steam or other vapour from the inner vessel, the operating temperature of the outer vessel is kept below an upper threshold of the operating temperature of a non-metallic seal such as a rubber seal used to seal the door in the outer vessel. The lower outer vessel temperature also reduces corrosion and allows for more conventional coatings, such as paints, to be used to protect the metal.

A prior art dual vessel reactor is shown in FIG. 1 in which a reactor 5 is shown having an inner vessel 10 within an outer vessel 20. The reactor 5 has a reactor lid 60 sealed to the outer vessel 20 using a metal API ring 70. A nitrogen environment 25 is established in the reactor 5. A heater 30 heats a liquid in the inner vessel 10 into which a reaction container may be placed. Heating of the inner vessel 10 and the inner vessel liquid 15 results in elevated temperature of the outer vessel 20 (for example it will rise in temperature until it is at the operating temperature of the inner vessel) and the necessity of a metal seal, such as the metal API seal 70.

FIG. 2 is an illustrative schematic of one embodiment of a dual vessel chemical reactor 100 wherein during operation a non-condensable gas is used to isolate an inner vessel 120 from an outer vessel 110. This isolation resulting in the cooling of the outer vessel 110 will be explained in more detail below.

The chemical reactor 100 has an inner vessel 120 for containing a liquid 115. The liquid 115 may be one of a reaction solvent for either dissolving a reactant or suspending a reactant, a solution for providing heat transfer to a reaction container 210 upon heating of the solution, or may be a reactant in liquid phase for reacting with a reactant in suspension or in a reaction container 210. The liquid may be water which forms steam upon heating or another liquid that forms vapour upon heating. The liquid 115 may be any organic or inorganic liquid, preferably with a boiling point above about 25° C. For the purposes of this disclosure, the term steam will be used to encompass both water steam and liquid vapour.

An outer vessel 110 encapsulates the inner vessel 120 and together with a reactor lid 140 form the pressure vessel for the chemical reactor 100. The outer vessel is typically made of a corrosion resistant alloy of a suitable thickness to withstand reaction pressures experienced during a chemical reaction to be carried out in the reactor 100. The outer vessel may be made from coated steel to resist corrosion and does not have to be made from costly stainless steel. For example, the outer vessel 110 may be made Monel®, Inconel® or Hastelloy®. Some coatings for the outer vessel 110 may include plasma, thermal coatings or weld cladding. The reactor lid 140 may be an automatic lid or a manually operated lid sealed to the outer vessel 110 when in a closed position by a seal 150. The seal 150 may be for example, but not limited, to a rubber o-ring or the like. As will be appreciated in the art, the use of o-rings depends on the temperature and the chemicals to which they will be exposed. For steam and temperatures below 200° C. o-rings made from ethylene propylene diene M-class rubber (EPDM), silicone rubber, Kalrex®, polyacrylate, Viton®, flurosilicone or Aflaf™ are available. The options become even wider if the outer vessel 110 is kept below 100° C. throughout the reaction. If necessary, the outer vessel 110 may be cooled so it does not go above a predetermined temperature. This additional cooling may be done for example, but not limited to by air or water cooling.

An inner vessel lid 125 covers the inner vessel 120 but does not hermetically seal the inner vessel 120 from the outer vessel 110. When the lid 125 is in place, the inner vessel 120 is not sealed from the outer vessel and the pressure between the inner vessel 120 and the space between the inner vessel 120 and the outer vessel 110 is equilibrated. The lid 125 may have one or more holes, or valves, for example but not limited to flapper valves or the like that allow the pressure in the inner vessel 120 and the pressure between the inner vessel 120 and the outer vessel 110 to equilibrate. Such a setup also prevents or minimizes any damage to the inner vessel 120 if the pressure in it is changed quickly (i.e. the steam is vented). The holes or valves allow pressure between the inner vessel 120 and the outer vessel 110 to equilibrate throughout the reaction.

A heat source 130 is used to heat the liquid 115 in the inner vessel 120. The heat source 130 may be any suitable heat source suitable for heating liquid in a reactor. For example, a flanged over-the-side immersion heater may be used or a band heater may be used which heats the outside of the inner vessel 120. Alternatively, external heating of the liquid 115 may be carried out using for circulation heaters where the liquid 115 is pumped out of the reactor 100, heated externally (by electricity, gas, etc.), and then pumped back into the inner vessel 120. Alternatively, a vapour injector for injecting heated vapour may used as described in co-pending Canadian patent application 2,582,815 which is incorporated herein by reference.

As will be discussed in more detail below, steam from the liquid 115 in the inner vessel 120 condenses on the outer vessel 110 during a reaction cooling the outer vessel 110. An optional pump 170 may be used to re-circulate liquid that condenses on the walls of the outer vessel 110 using piping 160.

The reactor 100 uses a non-condensable gas between the vessels 110 and 120 to limit the condensation of steam onto the inside wall of the outer vessel 110 and thereby limit the heating of the outer vessel 110 by the steam and negate the increase in the operating pressure of the reactor by the addition of the non-condensable gas. Non-condensable gases are gases that will not condense on the walls of the outer vessel 110 under the operating conditions (temperature and pressure) of the reactor 100. They may be supplied as compressed gas at room temperature and include for example both inert and non-inert gases and include oxygen, nitrogen, air, argon, methane, ethane, ethylene, hydrogen, helium, carbon monoxide, nitric oxide, nitrous oxide, and combinations thereof, etc. To achieve this, the non-condensable gas is substantially partitioned during operation into the space between the inner 120 and outer vessels 110 and the steam is partitioned into the inner vessel 120, thereby reducing or negating the effects of Dalton's Law. A comparative example will be used to illustrate these effects as well as the partitioning of the non-condensable gas from the steam and the operation of the reactor 100.

The inner vessel 120 may be constructed of any suitable material such as corrosion resistant alloys and alloys having a corrosion resistant coating. Exotic alloys may be used in the construction of the inner vessel 120 as the inner vessel 120 is much thinner than the outer vessel 110 and is therefore less expensive to fabricate. A non-limiting example of alloys that may be used in fabricating the inner vessel are stainless steel, Inconel®, Monel®, hastealloy, etc.

Comparative Example

The following comparative example is illustrative and the Applicant does not wish to be bound by theory.

A schematic of a dual reactor that does not partition the non-condensable gas is shown in FIG. 1. The dual reactor 5 does not have a cover and is used to illustrate one of the problems that has been overcome with the dual vessel reactor and method of carrying out a reaction as described herein with references to FIGS. 2 and 3. The reactor 5 has water in the inner reactor and the remainder of the space is filled by pressurized nitrogen. For example, the nitrogen has been set at a pressure that will create a partial pressure of 150 psi (1034 kpa) when the water has been heated to a certain temperature (for example 180° C.). When the water is heated to this temperature, the steam creates a partial pressure of water of 150 psi (1034 kpa). Using Dalton's Law the pressure in the vessel would then be 300 psi (2068 kpa). It can be seen from this example that it is not desirable to add nitrogen or other non-condensable gases, to the vessel as it increases the operating pressure of the vessel and thus the cost of the vessel as higher operating pressures require thicker metal in construction of the outer pressure vessel.

In a reactor such as that described herein, for example with reference to FIG. 2, non-condensable gas, such as nitrogen, is added to the reactor in FIG. 2 via for example an input 200 from a non-condensable gas reservoir 180, for example through the use of a valve 190. It will be appreciated that the non-condensable gas may be added to the reactor 100 using any suitable method and the reactor design is not limited to the method or apparatus for inputting the non-condensable gas. The non-condensable gas may be introduced through a series of valves (which may or may not be computer controlled), with pressure gauges to monitor their pressure. Introducing the non-condensable gas by computer control is the preferable method when introducing the non-condensable gas during the reaction. The non-condensable gas is added, for example, so that it will generate a pressure of approximately 150 psi (1034 kpa) when the nitrogen has been substantially partitioned in the space between the inner vessel 120 and the outer vessel 110. As the liquid 115 is heated in the inner vessel 120 to a point where the steam generates a pressure of 150 psi (1034 kpa) it builds up a pressure of steam in the inner vessel 120 and this pushes the non-condensable gas from the inner vessel 120 to the space between the vessels 120 and 110 (i.e. the steam substantially partitions the non-condensable gas into the space between the inner vessel 120 and the outer vessel 110 and the steam into the inner vessel 120). The partitioning process is a dynamic process. As the liquid is heated, and steam is generated, a mixture of non-condensable gas and steam flow out of the inner vessel 120 into the space between the inner 120 and outer vessel 110. However, because the walls of the outer vessel 110 are cooler than the steam, the steam condenses on them. When the steam condenses it reduces the pressure between the inner 120 and outer vessels 110 and this causes even more steam and nitrogen to flow out of the inner vessel 120. In this way the steam that enters the space between the inner 120 and outer 120 vessels continues to condense on the cooler walls of the outer reactor and eventually drives most of the non-condensable gas into the space between the inner 120 and outer 110 vessels partitioning the steam into the inner vessel 120 and the non-condensable gas into the space between the two vessels 110 and 120. The non-condensable gas in the space between the inner 120 and outer 110 vessels then acts as an insulator between the inner 120 and outer 110 vessels limiting heat transfer and maintains the outer vessel 110 cooler than the inner vessel 120 without steam continuously condensing on it as in FIG. 1. A situation is achieved where the pressure in the space between the inner 120 and outer 110 vessels is about 150 psi (1034 kpa) (mainly from non-condensable gas) and an equal pressure is observed inside the inner vessel 120 (mainly from steam).

If necessary, the outer vessel 110 may be cooled using an external cooling device.

Figure 4:
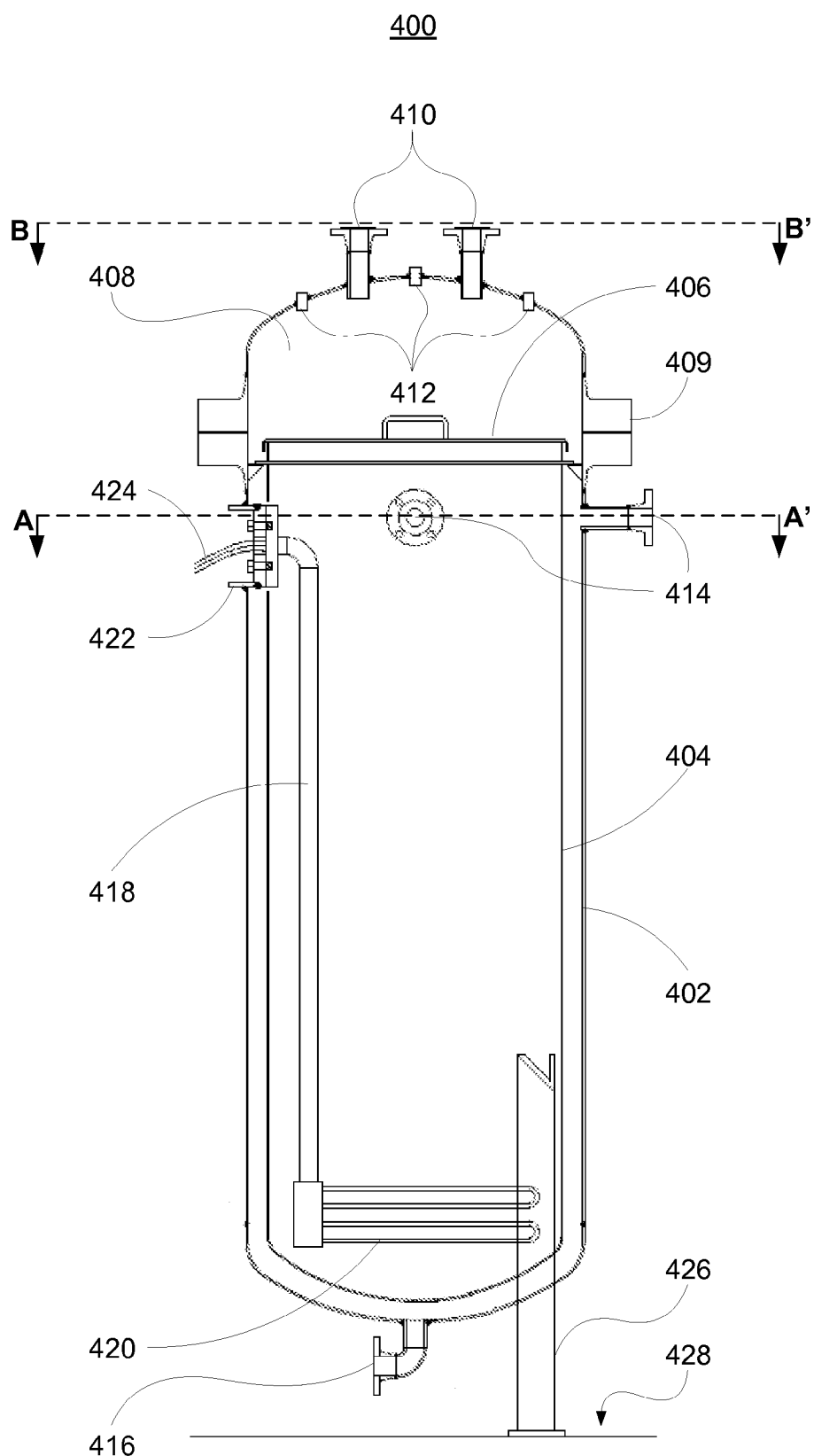
FIG. 4 depicts in a schematic a cross sectional view of an illustrative inner vessel for use in a dual vessel reactor.
Figure 5:
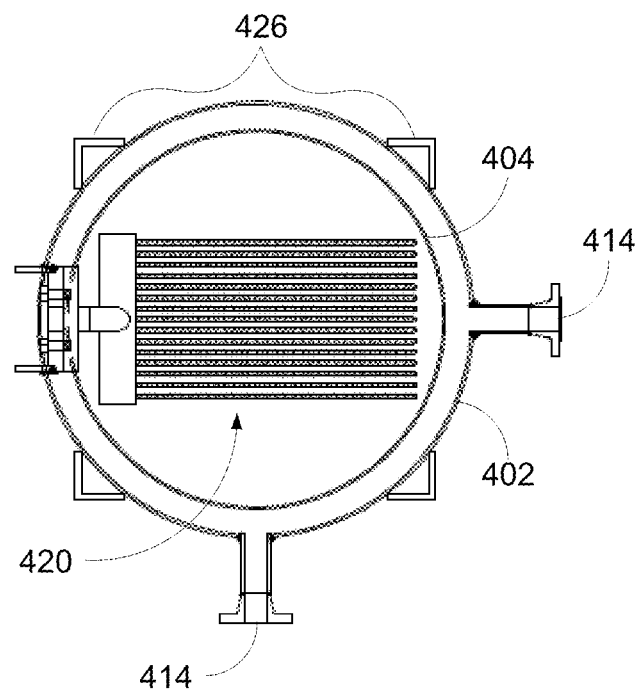
FIG. 5 depicts in a schematic a cross sectional view taken along the line A-A' in FIG. 4.
Figure 6:
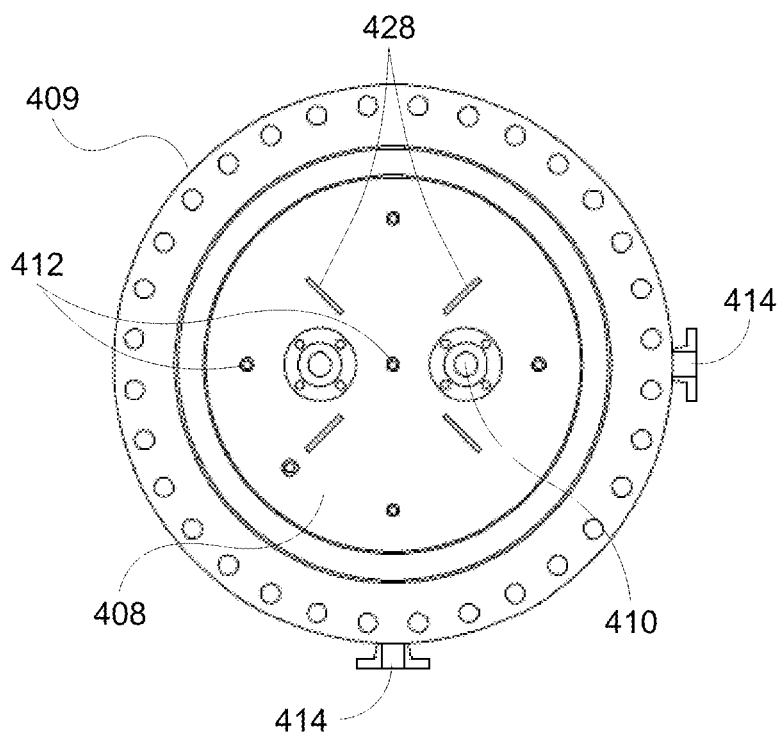
FIG. 6 depicts in a schematic a view taken along the line B-B' in FIG. 4.

FIG. 4 depicts in a schematic an inner vessel 400 that may be used as the inner vessel 120 of a reactor as described above. FIGS. 5 and 6 depict in schematics cross sections of the inner vessel 400 taken along lines A-A' and B-B' respectively. The inner vessel 400 has an outer shell 402 and an inner shell 404. The inner shell 404 is covered by a cover 406. The inner shell 404 is not sealed by the cover 406, and liquid is able to freely pass between the inner shell 404 and the outer shell 402. The inner shell 404 provides a container where reactions may take place.

The outer shell 402 is covered with a lid 408. The lid 408 has a collar 409 that seals the interior of the inner vessel 400; however, the lid 408 also includes passageways 412 that allow vapour, non-condensable gas, or a combination of the two to pass between the interior of the inner vessel 400 and the exterior of the inner vessel. The passageways 412 allow the interior of the inner vessel to be at a similar pressure as the interior of the outer vessel, which it is enclosed in.

The inner vessel includes a plurality of ports 410, 414, 416. Ports 410 may be used to exhaust vapour or steam from the interior of the inner vessel 400 once the reaction is completed. This exhaust may be used, for example, to preheat other reactions occurring in other reactors. Exhausting the vapour through ports 410 helps to cool down the inner vessel 400 once the reaction is completed. Ports 414 may be used as inlet ports to fill the inner vessel with the required liquid and possibly any other reactants, required for the reactions. Port 416 may be used as an outlet for emptying the liquid from the interior of the inner vessel. The port 416 may also be used to circulate, and possibly heat, the liquid in the interior of the inner vessel 400. The liquid could, for example, be circulated from the port 416 and input back into the inner vessel 400 via one of the ports 414.

A heater 418 comprising a plurality of heating elements 420 is suspended in the inner shell 404. The heater 418 is fixed to a flange 422 on the outer shell 402. The heater 418 may be fixed to the flange using, for example, bolts. The flange 422 allows an electrical wire 424 to pass through the outer shell 402, while maintaining the integrity of the outer shell 402.

The inner vessel 400 may be seated on a bottom surface of the outer vessel, depicted as 428 in FIG. 4. The inner vessel may be raised off of the bottom surface 428 by a supporting structure, such as for example, support legs 426.

Figure 7:
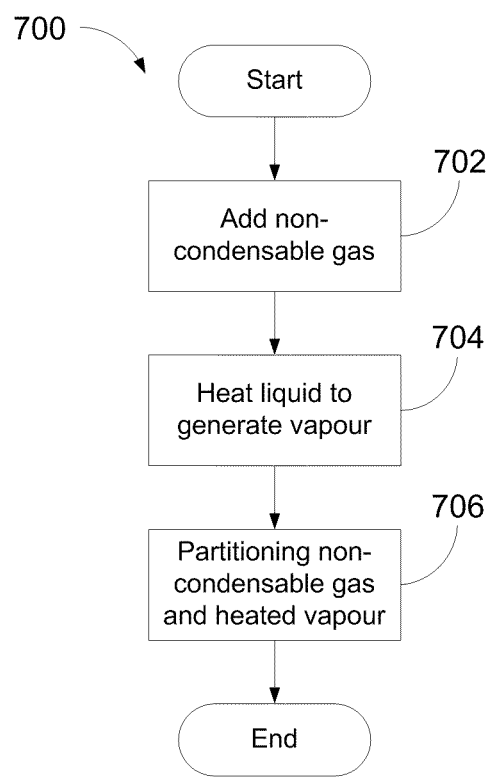
FIG. 7 depicts in a flow chart an illustrative method of maintaining an outer vessel at a temperature below a reaction temperature.

FIG. 7 depicts in a flow chart a method 700 of maintaining an outer vessel at a temperature below a reaction temperature. The method may be used to maintain the temperature of the outer vessel while carrying out a reaction in a dual vessel chemical reactor. The method begins with adding a non-condensable gas to the dual vessel reactor (702). The amount of non-condensable gas added may vary depending on the type of control used during the reaction. For example, a final amount of non-condensable gas may be added at the start, in which case further non-condensable case does not need to be added during the reaction. Alternatively a lower amount of non condensable gas may be added initially, and additional non condensable gas added during the reaction process. Regardless of the type of control used, an initial amount of non-condensable gas is added to the dual vessel reactor. With the non-condensable gas added, the liquid in the inner vessel is heated (704). The heating of the liquid brings the liquid temperature up to a reaction temperature. Vapour is formed from the heated liquid. The non-condensable gas and vapour is partitioned so that the vapour is substantially partitioned inside the inner vessel (704). This partitioning of the vapour to the interior of the inner vessel prevents vapour from condensing on the wall of the outer vessel, which would raise the temperature of the outer vessel.

The vapour is partitioned as a result of the non-condensable gas. The partial pressure of the non-condensable gas is maintained above the partial pressure of the vapour, which in combination with the passageways between the inner and outer vessels restricts the vapour from escaping the interior of the inner vessel.

Figure 8:
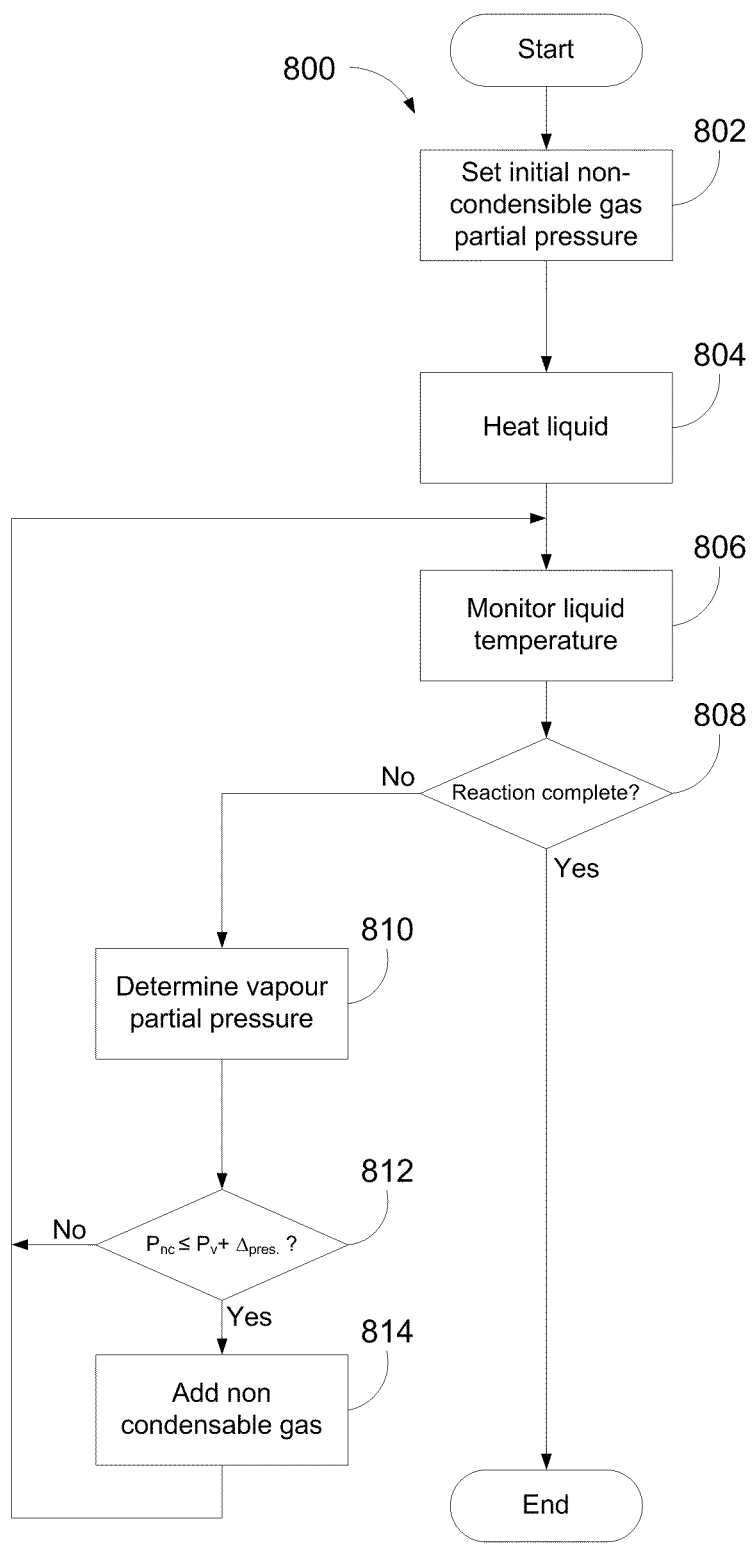
FIG. 8 depicts in a flow chart an illustrative method of maintaining an outer vessel at a temperature below a reaction temperature.

FIG. 8 depicts in a flow chart, a method 800 similar to method 700; however, the method 800 further comprises monitoring the temperature of the reaction to maintain a pressure differential between the non-condensable gas and the vapour. The method begins with adding an initial amount of non-condensable gas to the dual vessel reactor (802) and then heating the liquid (804) up to a reaction temperature. The method monitors the liquid temperature (806) and determines if the reaction is complete (808). If the reaction is complete (Yes at 808) the method ends. If the reaction is not complete (No at 808), the method determines a vapour partial pressure ($P_V$) that results from the liquid temperature (810). The method then determines if the partial pressure of the non-condensable gas ($P_{nc}$) is less than or equal to $P_V$ plus a pressure differential ($\Delta_{pres}$) that is to be maintained (812). If it is less than or equal to (Yes at 812) then more non-condensable gas is added to the dual vessel reactor (814) to restore the desired pressure differential. The method then returns to monitor the temperature of the liquid (806). If $P_{nc} > P_V + \Delta_{pres}$ (No at 812) the method returns to monitor the temperature of the liquid (806).

It will be appreciated that the above methods may be used to carry out various chemical reactions. The inner vessel may hold solid or large reactants, while further reactants may be added to the liquid that is heated.

Experimental Examples

A series of experiments have been performed validating the concept outlined above using a non-condensable gas in the space between the two vessels 110 and 120 thereby allowing the outer vessel 110 of the reactor 100 to run at a temperature that is much cooler than the inner vessel 120. The results of the experiments are shown in FIG. 3.

In the experiments, a pressure vessel (outer vessel 110) was used that is 36 inches diameter and 10 ft long, and rated at 150 psi (1034 kpa). It has an inner vessel 120 that can hold approximately 800 L of liquid (in this case water). The water is heated with an immersion heater 130. Any open spaces between the inner 120 and outer 110 vessels were minimized and two flapper valves installed in the lid 140 to allow the pressure to equilibrate between the vessels 110 and 120.

In the series of experiments water was heated in the inner vessel 120 from 25° C. to 180° C. and held there for 1 hour. Preset pressures of nitrogen were used (e.g. 40 psi (276 kpa) at 25° C.) and the temperature of the water and pressure was monitored in the vessel 120 as the water was heated to 180° C. The results are shown in FIG. 3 along with the vapour pressure curve for water.

It can be seen that the curves for the experiments with starting pressures up to 60 psi (414 kpa) merge with the curve for water but that the curve for the starting pressure of 95 psi (655 kpa) does not merge and is much higher.

The experimental data has been supplemented with computer modeling. For the experimental set up (i.e. volumes of the inner 120 and outer 110 vessels that contain non-condensable gas, etc) there is a cross over point. That is, at a starting pressure of about 70 psi (483 kpa) of non-condensable gas such as nitrogen, and at the end point, that is 180° C., all the nitrogen that is in the inner vessel 120 has been purged out of the inner vessel 120 and the pressure of nitrogen in the space between the inner 120 and outer 110 vessels (which now contains the nitrogen that was originally in this space plus the nitrogen purged from the inner reactor) equals the pressure of the steam in the inner vessel 120. That is the steam and the nitrogen has been partitioned.

It must be stressed that even though the reactor was started with a pressure of 70 psi (483 kpa) of nitrogen, the final pressure was 150 psi (1034 kpa), which is also the saturated vapour pressure of the water at 180° C., and this means that there was no nitrogen left in the inner vessel otherwise (through Dalton's Law) the pressure would have been higher.

For non-condensable gas starting pressures above 70 psi (483 kpa), it is not possible to purge all of the non-condensable gas out of the inner vessel 120 because it would result in a pressure between the vessels 110 and 120 that exceeds the steam pressure in the inner vessel 120. Part of this "surplus" remains in the inner vessel 120 and results in pressures that exceed the vapour pressure of water (see 95 psi (655 kpa) curve).

For non-condensable gas starting pressures below 70 psi (483 kpa), there is not sufficient non-condensable gas to fill the space between the two vessels 110 and 120 with non-condensable gas at 150 psi (1034 kpa) when the water is heated to 180° C. and there is what will be referred to as a "deficit" in non-condensable gas in the space between the vessels 110 and 120. This deficit is taken up by steam which can condense on the walls of the outer vessel 110 if the walls are cooler than the steam temperature. The bigger the deficit, the larger the heat flow to the outer reactor will be as steam condenses on it. For example, during the course of the experiment an additional 25 L of water condensed on the walls when the starting pressure was 8 psi (55 kpa) versus 60 psi (414 kpa).

Therefore, for the experiments used above, a useful starting pressure is about 70 psi (483 kpa). Under these conditions, and without any cooling to the outer vessel 110, the temperature rise of the vessel 110 was limited to 40° C. versus 155° C. if the non-condensable gas had not been there.

Even though the procedure described above limited the temperature rise to about 40° C. most of the heating that occurred came from the fact that steam is also purged out of the inner vessel 120 along with the non-condensable gas. This can be minimized further by adding the non-condensable gas as the water is actually being heated (not before the experiment) so that, for example, a surplus pressure of non-condensable gas of 10 psi (69 kpa) is maintained (i.e. 10 psi (69 kpa) over the equivalent steam pressure), and it is not therefore necessary to purge the non-condensable gas out of the inner vessel 120 as the water is heated.

Illustrative Processes for Carrying Out a Reaction

Taking a broader look at the process, some options for adding the non-condensable gas are but are not limited to:
1. Start with 150 psi (1034 kpa) and vent gas as the pressure rises.
2. Start with pressures ideally around the cross-over point.
3. To add non-condensable gas as the liquid is heated to maintain an excess pressure (over that of steam).

In options 1 and 2 the non-condensable gas is added and the vapour pushes it out of the inner vessel 120 into the space between the inner vessel 120 and the outer vessel 110. The process of pushing the non-condensable gas out of the inner vessel 120 also results in the transfer of steam into the space between the vessel 110 and 120 followed by the condensation of the steam onto the outer vessel 110. In option 3 this transfer is limited by adding the non-condensable gas as it is needed. A small pressure (for example 10 psi) of the non-condensable gas is used at the start of the process in the reactor 100. As the liquid 115 is heated and the pressure of the steam in the inner reactor rises, non-condensable gas is added to the space between the vessels 110 and 120 to maintain a pressure that is above the pressure of the steam in the inner vessel 120. For example, the excess pressure may be 10 psi. In this way, the non-condensable gas is purged out of the inner vessel 120 and heat transfer from the steam that accompanies it is minimized. The 10 psi is an example of what could be used for lower pressure reactions (for example up to 150 psi) but this pressure could be much higher for operations at higher pressures. It will be appreciated that the vapour pressure of the liquid 115 may be determined by measuring its temperature as it is being heated and computing its vapour pressure.

In terms of how well the inner vessel 120 is sealed, originally half inch of space around the immersion heater flange was provided. This resulted in an open space (to the outer vessel 110) of about 14 in$^2$ (90 cm$^2$). Under equivalent test conditions this open space caused an additional 12 L of water to condense during the experiment mentioned above.

Although the examples above use a pressure of 150 psi, the reactor 100 may operate at much higher pressures of 500 psi or 1000 psi as necessary for carrying out a specific reaction. The concept of partitioning the non-condensable gas from the steam for cooling the outer vessel 110 applies at high pressures as well and the examples above are merely illustrative and not limiting. The thickness of the pressure vessel increases as the pressure increases. Reaction pressures of up to 2,000 psi may be carried out in a reactor as described herein.

The devulcanization of rubber may be carried out in a reactor as described herein at a reaction pressure of not over 2000 psi and a reaction temperature of not over 350° C. The outer vessel 110 is kept cool by minimizing thermal contact between the two vessels 110 and 120 and by insulating the inner vessel 120 from the outer vessel 110 using the partitioned non-condensable gas and the vapour as described above. Some heat transfer through the non-condensable gas between the vessels 110 and 120 is observed, and of course any steam that condenses on the outer vessel 110 transfers heat. The condensation of steam can be reduced by introducing the non-condensable gas during the reaction and maintaining an excess pressure of the non-condensable gas over the steam as outlined in option 3 above. In one embodiment, the non-condensable gas is introduced by computer control.

The present invention has been described with regard to a plurality of illustrative embodiments. However, it will be apparent to persons skilled in the art that a number of variations and modifications can be made without departing from the scope of the invention as defined in the claims.

What is claimed is:

1. A dual vessel chemical reactor comprising:
   an outer vessel for sustaining a reaction pressure of at least 500 psi, the outer vessel comprising a non-condensable gas input for inputting a non-condensable gas directly into the outer vessel to substantially thermally isolate the outer vessel from the inner vessel during operation;
   a reactor lid on the outer vessel, the reactor lid openable for accessing an interior of the outer vessel;
   a seal for sealing the reactor lid with the outer vessel when in a closed position;
   an inner vessel enclosed within the outer vessel for containing a liquid, the inner vessel comprising a lid for covering the inner vessel, and a valve to equalize pressure between the inner vessel and the outer vessel during rapid pressure changes while allowing partitioning of the non-condensable gas in the outer vessel and vapour in the inner vessel during heating and cooling of the reaction, the inner vessel supported above a bottom surface of the outer vessel by a supporting structure;
   a heat source capable of heating the liquid in the inner vessel without directly heating the outer vessel; and
   a controller for maintaining an over-pressure of the non-condensable gas during the reaction.

2. The reactor of claim 1, wherein the reactor further comprises:
   a non-condensable gas reservoir in communication with the non-condensable gas input; and
   a valve for opening and closing the non-condensable gas input into the outer vessel.

3. The reactor of claim 1, wherein the valve is a flapper valve.

4. The reactor of claim 1, wherein the seal is one of: a metal seal, a rubber o-ring seal, or a composite gasket.

5. The reactor of claim 1, wherein the seal is a rubber o-ring seal.

6. The reactor of claim 5, wherein the rubber o-ring seal comprises one of ethylene propylene diene M-class rubber (EPDM), silicone rubber, perfluoroelastomer, polyacrylate, fluorocarbon elastomers, flurosilicone or copolymer of tetrafluoroethylene and propylene.

7. The reactor of claim 1, wherein the outer vessel is made from a corrosion resistant alloy.

8. The reactor of claim 7, wherein the corrosion resistant alloy is one of stainless steel, nickel-chromium alloy or nickel-copper alloy.

9. The reactor of claim 1, wherein the outer vessel is made from an alloy coated with a coating selected from the group consisting of: a paint coating, an enamel coating, a plasma coating, a thermal coating, a galvanized coating, a plated coating and a weld cladded coating.

10. The reactor of claim 1, wherein the inner vessel and the inner vessel lid are separated by an opening to allow pressure between the inner vessel and the outer vessel to equilibrate during operation of the reactor.

11. The reactor of claim 1, wherein the inner vessel and the inner vessel lid are separated using a flapper valve to allow pressure between the inner vessel and the outer vessel to equilibrate during operation of the reactor.

12. The reactor of claim 1, wherein the metal-to-metal contact between the outer vessel and inner vessel is limited, and the support structure supports the inner vessel while minimizing a heat transfer path to the inner vessel.

13. The reactor of claim 1, further comprising a plurality of valves, each of the plurality of valves capable of equalizing pressure between the inner vessel and the outer vessel during rapid pressure changes while allowing partitioning of the non-condensable gas in the outer vessel and vapour in the inner vessel during heating and cooling of the reaction.

* * * * *